United States Patent Office 3,095,856
Patented July 2, 1963

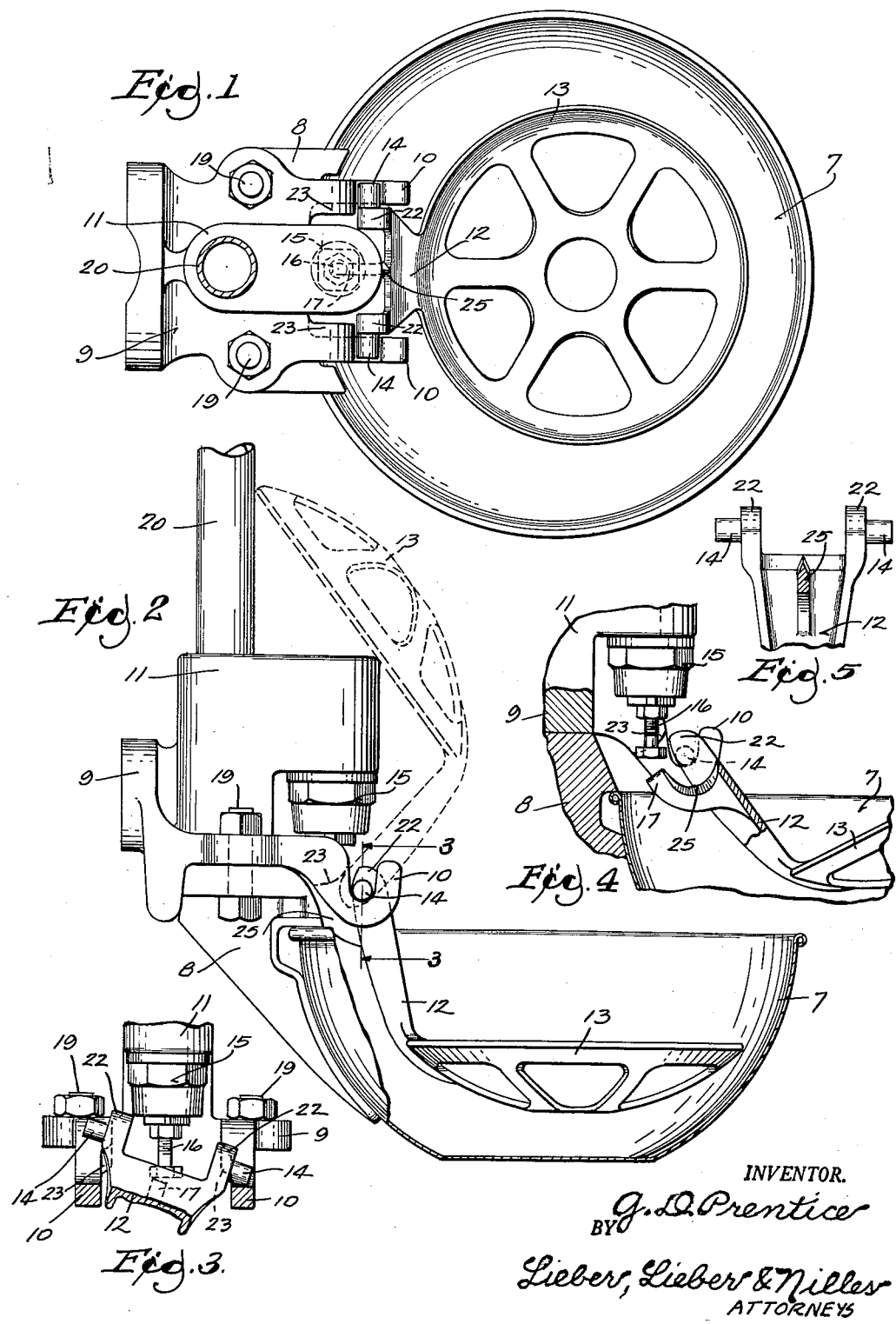

3,095,856
ANIMAL WATERING FOUNTAIN
George D. Prentice, Milwaukee, Wis., assignor to A. F. Klinzing Co., Inc., a corporation of Wisconsin
Filed Sept. 18, 1961, Ser. No. 138,726
4 Claims. (Cl. 119—75)

The present invention relates in general to improvements in the art of supplying drinking water to diverse animals, and it relates more specifically to improvements in animal actuated drinking fountains adapted to be manipulated by the noses of cattle or the like utilizing the fountains.

The primary object of this invention is to provide an improved animal watering fountain which is simple and compact in construction and efficient in operation.

It has long been customary to utilize animal watering fountains of the type embodying a fixed drinking bowl having a water supply valve at its rear portion operable by a lever extending into the bowl and which is manipulable by the nose of the thirsty animal to admit water from the valve into the bowl. In such a fountain, it is desirable to be able to elevate the nose actuated lever from approximately horizontal active position into substantially upright inactive position and to effect complete removal of the lever, in order to prevent the animals from overdrinking and to permit thorough cleaning of parts and access to the water supply valve. However, since these fountains are subject to rough treatment by the animals, the nose levers of the prior devices are frequently released from their normal supports and knocked entirely out of the bowls so that they are either broken or lost and thus make the fountains useless. While it has heretofore been attempted to obviate this nuisance by providing special retainers for preventing accidental release of the valve actuating levers, these have complicated the assemblages and obstructed rapid removal of the levers when required and were therefore highly objectionable.

It is therefore an important object of the present invention to provide an improved drinking fountain of the above-described general type, in which accidental release of the nose lever by the animals is positively eliminated while the lever is still quickly removable by an attendant without releasing special retainers.

Another important object of this invention is to provide an improved nose lever mounting for cattle watering bowls which enables the lever to be swung from horizontal into upright position but permits free removal of the lever only at an intermediate position by special manipulation.

A further important object of the invention is to provide a nose actuated fountain assemblage of utmost simplicity and great durability wherein the admitted water is effectively distributed within the bowl without excessive splashing and escape over the bowl brim.

Still another important object of the present invention is to provide an improved watering fountain in which back siphonage is positively prevented and wherein the velocity of the water admitted under high pressure is absorbed by a simple nose lever in order to avoid startling or annoying the animals.

These and other more specific objects and advantages of the invention will be apparent from the following description:

A clear conception of the features constituting the present improvement, and of the construction and operation of a typical commercial animal watering fountain embodying the invention, may be had by referring to the drawing accompanying and forming a part of this specification wherein like reference characters designate the same or similar parts in the various views.

FIG. 1 is a top view of the improved fountain with the nose lever in horizontal or active position within the bowl;

FIG. 2 is a part sectional side elevation of the same fountain, showing the nose lever in active position in full lines and in elevated inactive position in broken lines, the section being taken centrally through the bowl;

FIG. 3 is a fragmentary vertical transverse section through the nose lever mounting hooks or sockets of the fountain taken along the line 3—3 of FIG. 2, but showing a fragment of the partially raised nose plate suspension lever in elevation tilted laterally as when removal thereof is being effected;

FIG. 4 is a fragmentary vertical longitudinal section through the nose lever taken longitudinally and centrally through the unit, and also showing the nose lever partially elevated as when removal thereof is being effected; and FIG. 5 is a fragmentary top view of the pivotal end of the nose lever showing a transverse section through the splitter for disbursing the velocity of the water stream delivered from the supply valve into the bowl.

While the invention has been illustrated and described as having been embodied in a self-serving fountain especially adapted to supply drinking water for cattle, it might also be advantageously applied to watering devices for other purposes, and it is contemplated that specific descriptive terms employed herein be given the broadest possible interpretation consistent with the disclosure.

Referring to the drawing, the animal watering fountain illustrated therein comprises in general, an annular water receptacle or bowl 7 having its rear brim portion firmly attached to a support 8 which is clamped to a normally fixed stationary support or bracket 9 provided with laterally separated lugs projecting outwardly therefrom and terminating in upwardly open sockets or hooks 10, the support also including a water supply casing 11; a nose actuable lever 12 having a nose contact plate 13 normally disposed well within the bowl 7 and being provided with laterally spaced suspension arms having thereon aligned transverse rear pivots 14 adapted to seat within the hooks 10; and a water delivery valve 15 communicable with the interior of the casing 11 and having a depending operating stem 16 cooperable with a rear central projection 17 to open the valve 15 when the nose plate 13 is depressed.

The bowl 7 may be formed of cast iron, plastic, or corrosion-resistant sheet metal such as stainless steel, and the support 8 and bracket 9 may be metal castings firmly but detachably united as by bolts 19. The hooks 10 and the water supply casing 11 may be cast integral with the bracket 9 which serves as a mounting for the entire unit, and water may be delivered into the casing 11 through a supply pipe 20. The water delivery valve 15 may be of the well-known ball type seated by a spring which constantly urges the stem 16 outwardly, and this stem is adjustable from the exterior without dismantling the valve, but the valve 15 is preferably located well above the top of the bowl 7 in order to prevent back siphonage of liquid through the valve.

In accordance with the present invention, the pivotal mounting of the nose actuable lever 12 and the portion of the bracket 9 adjoining the hooks 10 are of special formation whereby this lever 12 cannot be removed by merely lifting the plate 13 vertically when the lever is in either active horizontal or inactive upright position as depicted in FIG. 2. The pivots 14 may be cylindrical, and the lever 12 is provided with enlarged cam portions 22 directly adjoining the inner ends of these pivots remote from their respective sockets which are adapted to engage inclined shelves or camming surfaces 23 formed on the fixed bracket 9 inwardly adjacent to thte hooks 10, and the rear projection 17 on the lever 12 is normally disposed in vertical alignment with the valve actuating stem 16 when the nose plate 13 is in active position.

If the nose lever 12 is merely lifted vertically from active position as shown in solid lines in FIG. 2, then the lever projection 17 will engage the valve stem 16 and will positively prevent the pivots 14 from leaving the hooks 10. When the lever 12 is swung upwardly about the pivots 14, the cam portions 22 adjoining these pivots move toward the adjacent inclined bracket surfaces 23 and actually contact the same before the valve lifting lever projection 17 may be moved out of vertical alignment with the valve stem 16. This contacting of the cam portions 22 with the bracket surfaces 23 thereafter continues until the lever 12 reaches its upright inactive position as shown in broken lines in FIG. 2, so that the nose lever pivots 14 cannot be lifted free of the hooks 10 at any time by merely lifting the lever 12 vertically.

But if the nose lever 12 is tilted or displaced laterally while it is being swung upwardly at an angle as illustrated in FIG. 3, then the uppermost pivot 14 moves forwardly sufficiently to permit this pivot to be lifted out of its hook 10 by the engagement of the adjoining cam portion 22 with the adjacent shelf surface 23 whereupon the lever projection 17 will also be moved out of alignment with the valve stem 16, and the entire lever 12 may then be freely removed from the sockets or hooks 10. By reversing these movements of the nose lever 12, it may be just as readily and quickly restored to socket engaging position, after the various parts have been thoroughly cleaned or the valve stem 16 has been adjusted to produce proper functioning of the valve 15 without opening the latter.

As previously indicated, the water supply valve 15 of the fountain is disposed well above the brim of the bowl 7 so as to eliminate possible back siphonage, and the mid portion of the rear projection 17 of the lever 12 which actuates the valve stem 16 is preferably provided with a splitter 25 as shown in FIGS. 4 and 5. Whenever the nose plate 13 is depressed to cause the projection 17 to open the valve 15, the entering stream of water strikes this splitter 25 and is divided into two parts which are deflected forwardly and sidewise against the adjacent suspension arms of the lever 12 thus decelerating the velocity of the entering water and causing it to drop into the bowl 7 in relatively quiescent condition. This is also an important feature of the present invention since it eliminates excessive spillage.

From the foregoing detailed description, it should be apparent that the present invention in fact provides an improved stock watering fountain which is simple in construction and efficient in operation. The improved formation of the nose lever mounting positively prevents objectionable displacement and removal of this lever by the animals using the fountain while still permitting rapid removal and replacement by an attendant. The location of the water supply valve also effectively prevents possible back siphonage, and the splitter formed on the nose actuated lever causes the entering water to flow smoothly into the bowl and prevents splashing. The improved fountain assemblage can be manufactured and sold at moderate cost and has proven highly successful in actual use.

Various modes of carrying out the invention are contemplated as being within the scope of the following claims particularly pointing out and distinctly claiming the subject matter which is regarded as the invention.

I claim:

1. In a self-serving animal drinking fountain, a stationary support having a pair of laterally spaced lugs projecting outwardly therefrom and terminating in upwardly open sockets, each of said lugs having a camming surface adjoining and spaced inwardly of its socket, a liquid confining bowl attached to said support below said lugs and the sockets thereof, a liquid supply valve carried by said support and having an actuating stem directed toward the interior of said bowl between said lugs, and a valve actuating lever having a nose contacting plate movable within said bowl and an end projection engageable with said valve stem and being provided with suspension pivots normally disposed within said sockets, said lever having a cam formed thereon adjacent to each of said pivots remote from said sockets and out of contact with said camming surfaces when said lever is in normal position with the nose contact plate thereof disposed within said bowl, said cams being movable into contact with said camming surfaces when said nose plate is swung out of said bowl to thereby prevent displacement of said lever and its pivots from said sockets except upon lateral tilting thereof.

2. A self-serving animal drinking fountain according to claim 1, wherein the bowl is independently detachable from the stationary support.

3. A self-serving animal drinking fountain according to claim 1, wherein the camming surfaces on the lugs are inclined downwardly and away from their adjacent sockets.

4. A self-serving animal drinking fountain according to claim 1, wherein the lever includes a jet splitter adjacent the valve stem engaging projection.

References Cited in the file of this patent

UNITED STATES PATENTS

| | | |
|---|---|---|
| 1,296,586 | Louden | Mar. 4, 1919 |
| 1,344,189 | Rassmann | June 22, 1920 |
| 1,797,963 | Neller | Mar. 24, 1931 |
| 2,260,817 | Anderson | Oct. 28, 1941 |
| 2,539,785 | Klinzing | Jan. 30, 1951 |